United States Patent [19]

Igarashi et al.

[11] Patent Number: 4,983,951

[45] Date of Patent: Jan. 8, 1991

[54] AUTOMOTIVE INFORMATION DISPLAY DEVICE

[75] Inventors: Osamu Igarashi, Katsuta; Takanori Shibata, Hitachi; Yoji Matuoka, Mito; Kazuhiro Watanabe, Ishioka; Kunio Terashima, Mito, all of Japan

[73] Assignees: Hitachi, Ltd., Tokyo; Hitachi Automotive Engineering Co., Ibaraki, both of Japan

[21] Appl. No.: 338,297

[22] Filed: Apr. 14, 1989

[51] Int. Cl.$^5$ ............................................. B60Q 1/00
[52] U.S. Cl. ..................................... 340/461; 340/995
[58] Field of Search ............... 340/461, 462, 995, 438, 340/700; 180/90; 358/103

[56] References Cited

U.S. PATENT DOCUMENTS

| | | | |
|---|---|---|---|
| 2,946,982 | 7/1960 | Conversano | 340/461 X |
| 4,225,005 | 9/1986 | Okabayashi | 340/461 X |
| 4,602,251 | 7/1986 | Sawada et al. | 340/995 X |
| 4,815,012 | 3/1989 | Feintuch | 340/995 X |
| 4,827,420 | 5/1989 | Musa | 340/995 X |

FOREIGN PATENT DOCUMENTS

| | | |
|---|---|---|
| 2240120 | 3/1975 | France . |
| 19652 | 2/1980 | Japan . |
| 101536 | 5/1987 | Japan . |

OTHER PUBLICATIONS

D. Scott, "Radio-Linked VDU Expands Driving Information", *Automotive Engineering*, vol. 93, No. 4, Apr. 1985, pp. 82-83.

*Primary Examiner*—Donald O. Woodiel
*Assistant Examiner*—Brian R. Tumm
*Attorney, Agent, or Firm*—Antonelli, Terry, Stout & Kraus

[57] ABSTRACT

An automotive information display device has a CPU unit capable of performing the processing of various informations, an electronic display unit including a liquid crystal panel and a plurality of switches for selecting the information to be displayed on the liquid crystal panel, and an information-reading actuating device capable of reading, in accordance with the instructions given by the CPU, information from a storage device and for enabling the read information to be displayed on the liquid crystal panel. The electronic display unit is extractable to the outside of the instrument panel. After the extraction of the electronic display unit, the display surface can be stationary at any desired angles both in the vertical direction and horizontal direction so that display surface correctly faces the driver or the assistant seat personnel, whereby the driver or the assistant seat personnel can look at the display surface in the front direction thereof for easy recognition of the display image.

12 Claims, 3 Drawing Sheets

AUTOMOTIVE INFORMATION DISPLAY DEVICE

BACKGROUND OF THE INVENTION

1. Field of the Invention

The present invention relates to an automotive information display device for displaying various information required on an automobile and, more particularly, to an automotive information display device incorporating a liquid crystal display unit.

2. Description of the Related Art

Conventionally, various meters or indicators such as speedometers, tachometers, travelling range meters are installed on instrument panels of automobiles. Recently, however, there is an increasing demand for a wider variety of information to be displayed, such as the result of a self-checking just before starting, traffic guide information which is to be given when the automobile has approached a crossing, a road map with or without indication of a desired route on the map, and so forth.

In general, display devices or indicators are required to have a large display area to enable various types of information to be displayed in a manner which facilitates recognition. Unfortunately, however, it is difficult to find sufficient space for installing a large display panel in the restricted area around the driver's seat or an the instrument panel. In addition, a display panel having such a large display area not only restricts the field of vision but also hampers the driving.

Various proposals have been made for the purpose of overcoming this problem. For instance, Japanese Patent Unexamined Publication No. 62-72831 discloses a display system having a cathode ray tube (CRT) installed in the instrument panel of an automobile, such that the display screen of the CRT is directed towards an aperture formed in the upper surface of the instrument panel. The image on the CRT screen is reflected and projected by a mirror which is set at the opening at a predetermined angle. Japanese Patent Unexamined Publication No. 61-282139 discloses a system employing a liquid-crystal type electronic display panel which is retractably received in a recess formed in the instrument panel.

The system incorporating a CRT, however, encounters the difficulty of reducing the size of the CRT, in particular the size measured in the direction normal to the screen to accommodate the CRT in the dashboard. In consequence, the CRT undesirably restricts the space for installation of an air-conditioner duct and other instruments even if the CRT is installed with its screen directed upward.

On the other hand, the system employing the liquid-crystal type electronic display panel has a small thickness and can advantageously be installed in the recess of the instrument panel in a retractable manner. In addition, the panel can be set such that the display surface is directed obliquely upward so as to improve the viewing angle characteristic in the vertical direction to some extent. Unfortunately, however, no specific consideration is given for the purpose of improving the viewing angle characteristic in lateral directions.

In general, information displayed on an automotive instrument panel is to be read by the driver or a passenger assisting the driver. Therefore, when a liquid-crystal type device is used, it is necessary to improve the viewing angle characteristic of the liquid crystal as much as possible.

SUMMARY OF THE INVENTION

Accordingly, an object of the present invention is to provide an automotive information display device which is constructed to enable its display surface to be oriented and set in any desired direction for facilitating recognition by the driver, as well as by a passenger assisting the driver, while improving the space factor for installation in an automobile, thereby overcoming the above-described problem of the prior art.

To this end, according to the present invention, there is provided an automotive information display device having a CPU capable of performing the processing of various information, an electronic display unit including a liquid crystal panel and a plurality of switches for selecting the information to be displayed on the liquid crystal panel, and a data-reading actuating device capable of reading, in accordance with the instruction given by the CPU, information from a storage device and for enabling the read information to be displayed on the liquid crystal panel. The electronic display unit is extractable so as to be freely slideable to the outside of the instrument panel. After the extraction of the electronic display unit, the display surface can be stationed at any desired angle both in the vertical direction and the horizontal direction such that the display surface correctly faces the driver or a passenger assisting the driver, so that the driver or the assistant can look into the display surface in the best position for easy recognition of the display image.

According to the present invention, the display surface of the information display device can be oriented in and stationed at any desired angle, so that the driver or the assistant can easily recognize the display without changing posture. In addition, since all the components of the display device are assembled in a compact unit and encased in a casing, the space factor in the automobile is improved and the maintenance of the equipment is facilitated.

DESCRIPTION OF THE PREFERRED EMBODIMENT

A preferred embodiment of the present invention will be described hereinunder with reference to the accompanying drawings.

Figure 1:
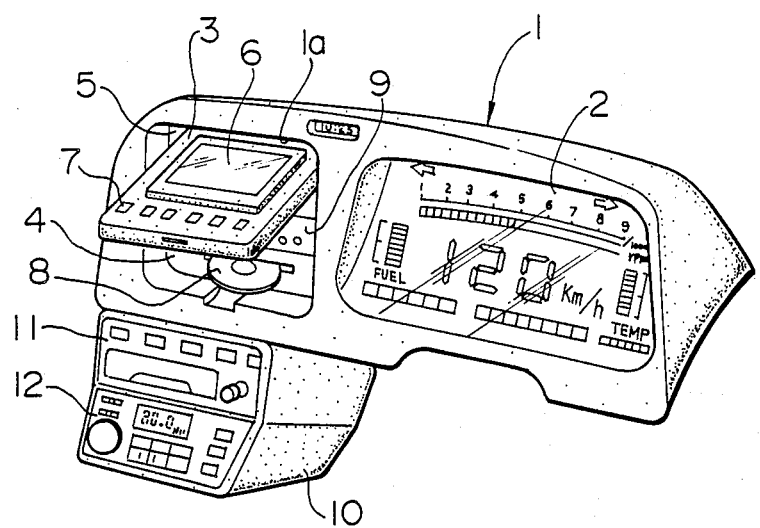
FIG. 1 is an illustration of an information display device of the present invention in a state installed on the instrument panel of an automobile.

FIG. 1 shows a general arrangement of various devices on and around an instrument panel and a console body of an automobile.

On the instrument panel 1 are arranged a meter unit 2 which is capable of indicating travelling speed and travelling range and an electronic display unit 3 which includes a liquid crystal panel capable of showing the route and other information on a map which is displayed thereon. The electronic display unit 3 also has a plurality of switches 7 which are used for selecting the information to be displayed on the liquid crystal panel, control of the power supply, and so forth.

The electronic display unit 3 is capable of being received in a case 5 which is fixed in an aperture 1a formed in the instrument panel 1. The case 5 also receives, in addition to the electronic display unit 3, a data-reading actuating unit 4 for reading the information to be displayed, such as map information previously stored in, for example, a CD-ROM 8 and a device (referred to as central processing unit or CPU) 9 capable of giving actuating instructions to the actuating unit 4 and including processing means for processing various other information. An air-conditioner-operating portion 11, a radio 12 and other devices are installed in a console box 10.

Figure 2:
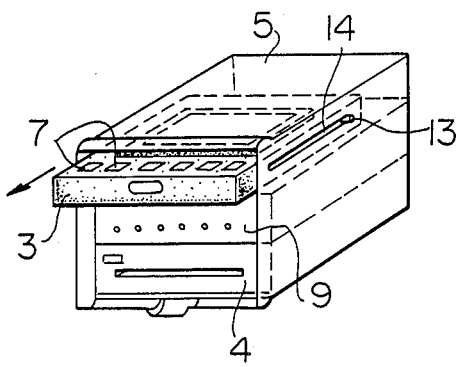
FIGS. 2 to 4 are illustrations of the manner in which an electronic display unit of the information display device of the invention is extracted from a case.
Figure 3:
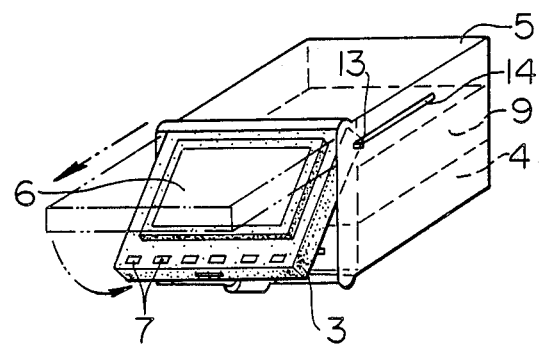
Figure 4:
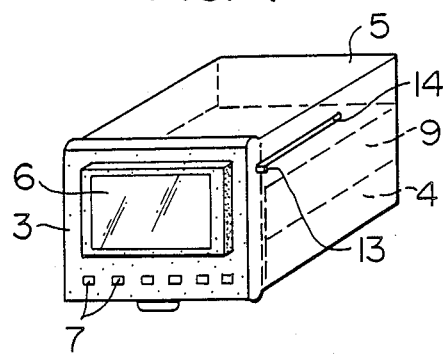

The electronic display unit 3 is capable of being extracted from the case 5 and fixed on the front side of the case 5 in a manner which will be explained hereinafter with reference to FIGS. 2 to 4. In FIG. 2, the electronic display unit 3 has been slightly extracted from the fully-retracted position as indicated by an arrow. The extraction is conducted smoothly because pins 13 fixed to the left and right rear ends of the electronic display unit 3 slide along guide slots 14 formed in the walls of the case 5. When the pins have reached the front ends of the guide slots 14, the electronic display unit 3 is swung about the pins 13.

Figure 5:
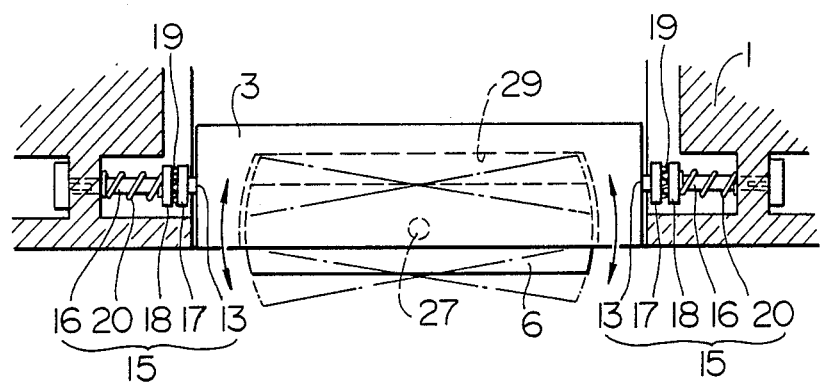
FIG. 5 is an illustration of a mechanism which allows swinging of the electronic display unit.

FIG. 5 shows a mechanism which allows the electronic display unit 3 to swing. This mechanism has, at each side of the electronic display unit 3, a pin 16 fixed to the instrument panel 1 in an opposing relation to the pin 13 fixed to the electronic display unit 3, disks 17 and 18 which are fixed respectively to the adjacent ends of these pins 13 and 16 so as to oppose each other, serrations 19 formed on the opposing surfaces of these disks 17 and 18, and a spring 20 which resiliently urges the disk 18 toward the pin 16. When the electronic display unit 3 has been moved to the position where the pins 13 reach the front ends of the guide slots 14, the serrations 19 on the disks 17 and 18 at each side of the electronic display unit 3 engage with each other so that the electronic display unit 3 becomes swingable about the common axis of the pins 13 and 16. It will be seen that the serrations 19 on both disks provide clicking during swinging of the electronic display unit 3. Thus, the swinging mechanism 15 has click means so that the electronic display unit 3 can be swung to and stationed at any desired inclination angle. FIG. 4 shows a state in which the electronic display unit 3 has been further swung to a position where it closes the front opening of the case 5.

According to the invention, the liquid crystal panel 6 provided on the electronic display unit 3 is rotatably movable to the right or left side independently of other portions of the electronic display unit 3. More specifically, referring to FIGS. 5 and 6, the liquid crystal panel 6 is received in a recess 29 formed in the electronic display unit 3 and is rotatable about a shaft 27 provided in a rotation mechanism 26, as shown by broken lines. The rotation mechanism 26 has, at each side of the liquid crystal panel 6, a pin 24 which is received at its one end in rotation-stopping means 28 provided on the information display device 3, a disk 22 having a serration 23 and fixed to the other end of the pin 21, a disk 24 fixed to the liquid crystal panel 6 and having a serration 23, and a spring 25 which urges the pin 24 so that the serrations 23 on both disks 21 and 22 mesh with each other. Thus, the rotation mechanism 26 has a construction which is substantially the same as the swinging mechanism 15 explained in connection with FIG. 5, so that the liquid crystal panel 6 is rotatable right and left and can be placed at any desired stationary position by the click mechanism.

When the electronic display unit is stored within the instrument panel, its display surface is kept horizontal, i.e. facing vertically. When the display is to be used, the electronic display unit is pulled forward in a sliding state without changing its orientation and, after the pins 13 have been moved to the ends of the guide slots 14, the unit is swung through a suitable angle and the liquid crystal panel is rotated through a suitable angle so that the display surface faces the driver or the assistant seat personnel. The click means provided in the swinging mechanism and the rotation mechanism enables the display surface, i.e., the surface of the liquid crystal display panel, to be fixed at any desired position. As will be understood from the foregoing description, the present invention provides an electronic display device in which the viewing angle characteristic is remarkably improved.

As explained before, since the swinging mechanism 15 is provided at the right and left sides with two identical constitutions as viewed in FIG. 5, the corresponding components of these two constitutions are denoted by the same reference numerals in FIG. 5.

Figure 6:
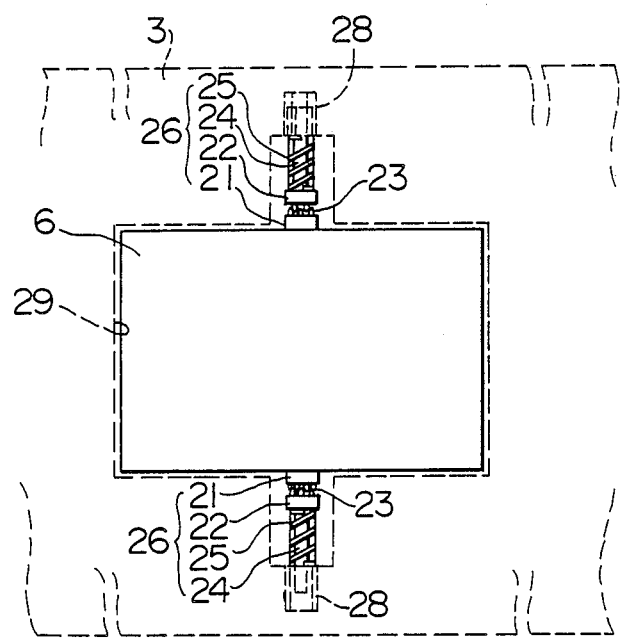
FIG. 6 is an illustration of a mechanism which allows swinging of a liquid crystal.

Similarly, corresponding components of two constitutions of the rotation mechanism 26, arranged at the upper and lower sides as viewed in FIG. 6, are denoted by the same reference numerals.

As will be understood from the foregoing description, in the information display device of the present invention, the display surface provided by the liquid crystal panel 6 can be fixed at any suitable swinging angle about the axis of the pins 13 of the swinging mechanism 15 and at any suitable rotational position about the axis 27 of the rotation mechanism 26 so as to make the display surface of the liquid crystal display panel face the driver or the assistant. Although liquid-crystal type display devices generally exhibit inferior viewing angle characteristic such that the displayed image becomes obscure when viewed in directions oblique to the plane of the display surface, such a shortcoming is obviated in the present invention because the driver or the assistant can see the display image in a direction normal to the plane of the display surface.

Hitherto, when the driver looks at the travelling track of the automobile on a minute display image of a road map, he has to move his body so that he has a position in the front direction of the display. This is quite inconvenient from the view point of safety in driving.

According to the present invention, this problem is overcome because the information display device can be used with its display surface exactly facing the driver to enable the driver to see the display in the best condition. Further, it is noted that the electronic display unit 3 and units necessary for displaying various information on the unit 3, i.e., the data-reading actuating unit 4 and the CPU unit 9 are encased in a compact manner within a single case 5, so that it is not necessary for these devices to be installed separately and independently but only the installation of the case 5 is necessary at a predetermined position in the compartment. In consequence, the time required for assembling the parts in the compartment is reduced.

In the display device of the invention, all the units are received in the single case with the result that it is very advantageous from the view point of ease of maintenance.

The size of the space for mounting the information display device is determined solely by the size of the case. Therefore, the installation space can be preserved simply by forming an opening of a predetermined size in the casing. Thus, the information display device of the invention improves the space factor and facilitates the mounting because the case can be fixed without difficulty.

Although the invention has been described through its preferred form, it is to be understood that the described embodiment is only illustrative and various changes and modifications may be imparted thereto.

For instance, the electronic display unit 3 may be installed so as to be horizontally placed in a lower portion of the case 5, although in the described embodiment the electronic display device 3 is placed horizontally in an upper portion of the case.

It is also possible to arrange such that the electronic display unit 3 is installed along the left or the right wall of the case 5. In such a case, the pair of guide slots 14 are formed in one of the side walls such that they are vertically spaced from each other.

The swinging mechanism shown in FIG. 5 may be modified such that a clicking engagement is attained between each of the disks on the pins 13 and each of the walls around the guide slots 14 when the pins 13 have been brought to the front ends of the guide slots 14. In such a case, it is unnecessary to mount the parts such as pins 16 and the springs 20 on the instrument panel, thus facilitating the production and assembly.

Finally, it is to be understood that the use of the case 5 is not essential. In other words, the case may be constructed integrally with the instrument panel so as to receive the components of the information display device including the electronic display unit 3. Thus, the case used as a part separate from the instrument panel may be omitted provided that a suitable cavity is formed in the instrument panel so as to receive the electronic display unit and other components and to allow them to be extracted as desired.

Other changes and modifications are still possible without departing from the scope of the present invention which is limited solely by the appended claims.

What is claimed is:

1. An automotive information display device for displaying various kinds of information in an automobile, comprising:
   a processing unit for processing various information in an automobile;
   a memory information-reading actuating unit for reading, in accordance with an instruction given by said processing unit, selected recorded information;
   a display unit including a display panel for displaying the information read by said information-reading actuating unit;
   an instrument panel having an opening portion formed therein in which opening portion said processing unit, said actuating unit and said display unit are received; and
   means for mounting said display unit in the opening portion so as to be retracted into or extracted from said opening portion and rotatable about a first axis when the display unit has been extracted from the opening portion, while said display panel is mounted in said display unit so as to be movable about a second axis transverse to said first axis, to position said display panel for viewing.

2. An automotive information display device according to claim 1, comprising: means for holding said display panel at a selected one of a plurality of inclination angles.

3. An automotive information display device according to claim 2, wherein said mounting means for rotatively moving the display unit about said first axis includes click means for holding the display unit at a selected one of a plurality of angles.

4. An automotive information display device for displaying various kinds of information in an automobile, comprising:
   a processing unit for processing various information in an automobile;
   a memory information-reading actuating unit for reading, in accordance with an instruction given by said processing unit, selected recorded information;
   a display unit for displaying the information read by said information-reading actuating unit;
   an instrument panel having an opening formed therein in which opening said processing unit, said actuating unit and said display unit are received; and
   support means for mounting said display unit in said opening so as to be retracted into or extracted from said opening and so that the display unit is rotatively movable about a horizontal axis to cover the opening when the display unit is extracted from the opening;
   said display unit including a display panel and a frame in which said display panel is mounted for rotation about a vertical axis;
   a case accommodating said processing unit, said information-reading actuating unit and said display unit, said case being received in said opening of said instrument panel.

5. An automotive information display device according to claim 4, comprising means for rotatively retaining said display unit at a selected one of a plurality of desired inclination angles on the front side of said opening.

6. An automotive information display device according to claim 5, wherein said means for rotatively retaining the display unit includes click means for holding the display unit at the selected one of said plurality of angles.

7. An automotive information display device comprising:
   an instrument panel of an automobile having an opening formed in the front wall thereof;
   case means disposed in said opening of said instrument panel and having guide means extending substantially in the longitudinal direction of said automobile;
   information display means disposed in said case means and having guide pins engaging with said guide means so that said information display means is movable in said longitudinal direction, said display means including a body and a liquid crystal panel; and
   rotatable moving means for supporting said body and said liquid crystal panel of said display means for rotatable movement about a respective axis, said rotatable moving means including a first rotatable moving mechanism including first engaging members provided on ends of said guide pins of said display means and having an engaging serration on the surfaces thereof facing said case means and second engaging members provided on said case means and having serrations engageable with said serrations on said first engaging members when said body of said display means has been extracted from said case means, and a second rotatable moving mechanism including third engaging members provided on said liquid crystal panel and having serrations on their surfaces facing said body of said display means, and fourth engaging members provided on said body of said display means and having serrations engaging with said serrations on said third engaging members.

8. An automotive information display device for displaying various kinds of information in an automobile, comprising:

a processing unit for processing various information in an automobile;

a memory information-reading actuating unit for reading, in accordance with an instruction given by said processing unit, selected recorded information;

a display unit for displaying the information read by said information-reading actuating unit, including a liquid crystal panel arranged in a recess formed therein; and an instrument panel having an opening portion formed therein in which opening portion said processing unit, said actuating unit and said display unit are received, said display unit being mounted in the opening portion so as to be retracted into or extracted from said opening portion and so that the positions of the display unit and the liquid crystal panel are independently adjustable when the display unit is extracted from the opening portion.

9. An automotive information display device according to claim 8, comprising means for rotatively moving said display unit to a selected one of a plurality of desired inclination angles on the front side of said opening portion.

10. An automotive information display device according to claim 9, wherein said means fore rotatively moving the display unit includes click means for holding the display unit at the selected one of said plurality of angles.

11. An automotive information display device according to claim 8, wherein said display unit includes a click means for keeping said liquid crystal panel at any desired stationary position.

12. An automotive information display device according to claim 8, wherein said display unit is placed on the upper side of said processing unit and said memory information-reading actuating unit both of which are received in said instrument panel in a stacked state.

* * * * *